US005263414A

United States Patent [19]

Lehrrieder et al.

[11] Patent Number: 5,263,414

[45] Date of Patent: Nov. 23, 1993

[54] MATERIAL WEB GUIDE ASSEMBLY

[75] Inventors: Edwin P. J. Lehrrieder, Gaukönigshofen; Franz K. Mezger, Lauda/Königshofen, both of Fed. Rep. of Germany

[73] Assignee: Koenig & Bauer Aktiengesellschaft, Wurzburg, Fed. Rep. of Germany

[21] Appl. No.: 3,515

[22] Filed: Jan. 12, 1993

[30] Foreign Application Priority Data

Jan. 31, 1992 [DE] Fed. Rep. of Germany ....... 4202713

[51] Int. Cl.[5] ........................ B41F 13/54; G03B 1/56

[52] U.S. Cl. ........................................ 101/228; 226/92

[58] Field of Search ........................ 101/227, 228, 181; 226/91, 92

[56] References Cited

U.S. PATENT DOCUMENTS

| | | | |
|---|---|---|---|
| 2,862,705 | 12/1958 | Faeber | 226/92 |
| 3,761,001 | 9/1973 | Bolza-Schunemann et al. | 101/181 |
| 3,995,553 | 12/1976 | Winterholler et al. | 101/228 |
| 4,569,285 | 2/1986 | Forno et al. | 101/248 |
| 4,646,636 | 3/1987 | Gertsch | 101/228 |
| 4,819,557 | 4/1989 | Handschuher | 101/228 |
| 4,987,830 | 1/1991 | Fukuda et al. | 101/228 |
| 5,052,295 | 10/1991 | Suzuki et al. | 101/227 |

FOREIGN PATENT DOCUMENTS

| | | |
|---|---|---|
| 0094631 | 11/1983 | European Pat. Off. . |
| 0129660 | 1/1985 | European Pat. Off. . |
| 0355026 | 2/1990 | European Pat. Off. . |
| 2021246 | 12/1971 | Fed. Rep. of Germany . |
| 3541588 | 6/1986 | Fed. Rep. of Germany . |
| 4110668 | 5/1992 | Fed. Rep. of Germany . |

*Primary Examiner*—Eugene H. Eickholt
*Attorney, Agent, or Firm*—Jones, Tullar & Cooper

[57] ABSTRACT

A material web guide assembly for a rotary printing press having at least one shiftable web guide roller utilizes fixed and movable guide assemblies to provide a web guide path for guiding a web being threaded through the press. The movable guide assembly is shiftable with the shiftable web guide roller. Cooperating guide channels on the fixed and movable guide assemblies cooperate with each other to lengthen or shorten the guide path in concert with movement of the shiftable web guide roller.

20 Claims, 10 Drawing Sheets

24
26
27
28
29
30
31
32
33
34
35
36
37
38
39
41
42
43
44
48
11
11'
B
C
d
VI
VI 53
54
57
11
11'
43
44
34
27
36
56
48
82
83
B
C
E
XIV
d1
d2
d3
d4
d5
d6
d7
d8

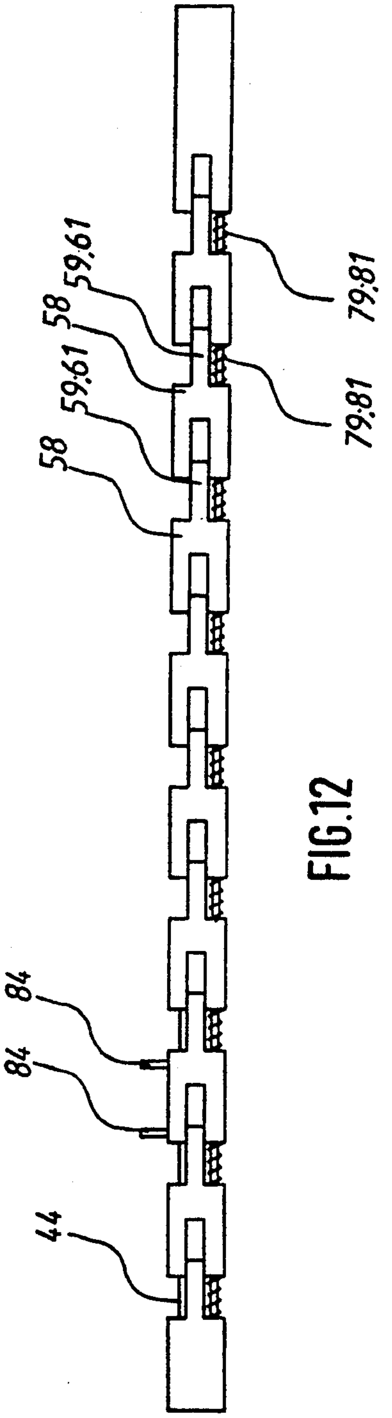
FIG.12
FIG.14
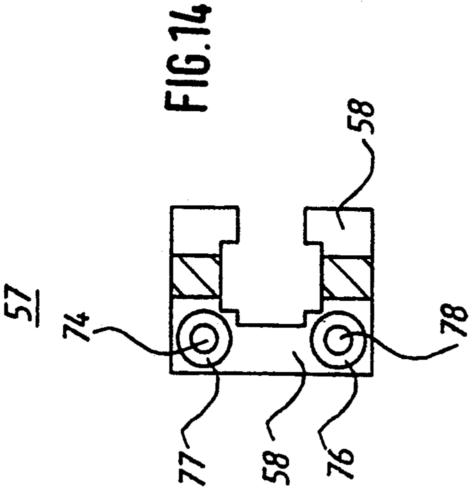
FIG.13
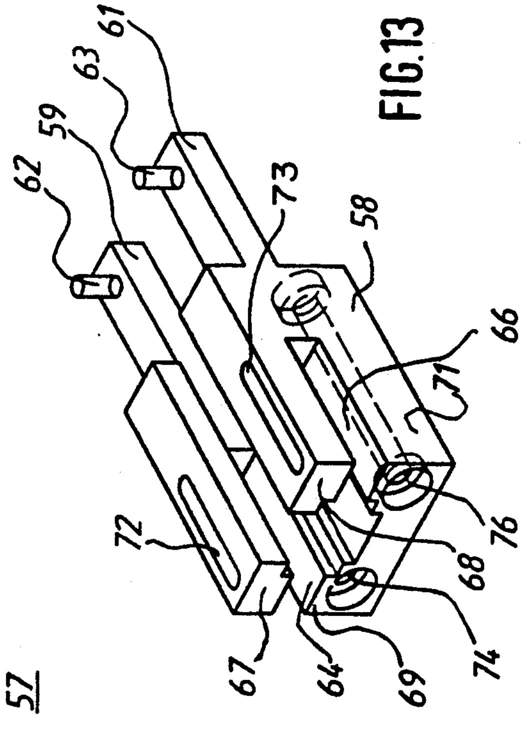

101
11'
37
27
43
36
48
B
98

36
93
94
8
99
100
100
27
106
25
f
XIX
XIX
11
C

MATERIAL WEB GUIDE ASSEMBLY

FIELD OF THE INVENTION

The present invention is directed generally to a material web guide assembly. More particularly, the present invention is directed to a material web guide assembly for a printing press. Most specifically, the present invention is directed to a material web guide assembly for guiding a material web as it is threaded into a web-fed rotary printing press. The material web guide assembly is usable with a press that has at least one adjustable or shiftable web guide roller. The web feeding or pulling elements, which may be chains or other similar pulling devices, are guided by fixed and shiftable guide assemblies. These guide assemblies cooperate to form a guide path whose overall length can be changed to form a material web guide path which will pass around the adjustable or shiftable web guide roller regardless of its position in the web-fed rotary press.

DESCRIPTION OF THE PRIOR ART

It is generally known in the art to provide material web threading or feeding devices to thread material webs into web-fed rotary printing presses. These web feeding devices are frequently executed as chains or similar pulling devices that are provided with clips or clamps that can engage a leading edge portion of the material web to be fed or threaded into the printing press. These web threading or feeding devices typically have a finite length and follow a guide path around various web guide rollers which are supported in side frames of the web fed rotary printing press. It is not unusual to provide a plurality of different web threading paths with these paths being provided with shunts so that the material web can be fed through the areas in different ways in accordance with the various printing requirements to which the printing press may be subjected.

One prior art device that is usable for threading material webs into web-fed rotary printing presses of the type discussed generally above is shown in German patent specification No. 20 21 246. In this device there are provided guide elements which extend along the threading path, as well as a pulling device that moves along the guide path. The pulling device consists of several members which are linked together. These include a motor trolley that is drivable by an electric motor and which is linked by a coupling with a trailer that is used to transport the storage batteries which ar required to supply the electricity that is utilized to operate the electric motor of the motor trolley which threads the material web.

A limitation of this prior art device arises especially when the device is being used in a press that can accomplishing multiple printing steps on a printing material web. Since the press can operate in several modes, the printing web has to be fed around adjustable web guide rollers which are also called register rollers. Since these adjustable web guide rollers can be placed in any position within their range of adjustment, the guide path for the web threading or feeding element must be placed so that the web will always be fed outside of the position of the register rollers. Even though the rollers may not be at their outermost positions in their range of adjustment, the web must be threaded around such an outermost position. This results in the need to place the web guide channel around the roller in its outermost position. This means that the threading path between two printing units in the printing press will always be at its greatest length. If the adjustable roller is not also in this extreme outer position, which it usually is not, the result is that there will occur during the web feeding-in procedure the formation of a loop or bag of excess printing web material. This bag formation is clearly not desirable and can lead to breakages of the web material.

In the European published unexamined patent application No. 01 29 660 A2 there is shown a material web feeding or threading-in assembly which is intended to eliminate the bag formation problem. In this device the compensation cylinder is driven into the end position for receiving the material web. To be able to drive the compensation cylinder or the adjustable web guide roller with the required speed, the device disclosed in this patent application is provided with a drive device that has an overdrive as well as a crawling speed. In this prior art device there is a complicated gear mechanism that is required to operate this adjusting device. This adjusting device also requires a fine adjustment of the register roller to be made each time the material web becomes misaligned. Such misalignments are quite apt to occur.

Another prior art device that is usable to thread printing material webs into rotary printing presses is disclosed in German patent specification No. 35 41 588. In this device there is provided a threading-in element which can be stiffened or adjusted in a two-dimensional direction by means of two stationary positioned stops, and which passes guide elements which are arranged at spaced distances to each other in the machine frame that also has stops. With the use of these stops, the movement of the threading-in element, which consists essentially of members that are hingedly connected with each other, can be directed around the paper guide rollers or regular rollers independently of their actual positions.

One limitation of this prior art device, which has to be passed by the threading-in element in certain specific distances, is that the stops in the guide pieces have to be readjusted in accordance with the position of the register roller. This readjustment of the stops requires a significant effort as well as a large expenditure of forces. An additional limitation of this prior art device is that, since the component parts of the chain have complicated shapes, they tend to quickly become covered with dirt or other contaminants. It is also necessary with this prior art device to arrange several shunts subsequently behind each other. This means that this device frequently cannot be used due to a lack of space.

It will be apparent that a need exists for a web guide that overcomes the limitations of the prior art devices. The material web guide assembly of the present invention provides such a device and is a significant improvement over the prior art.

SUMMARY OF THE INVENTION

It is an object of the present invention to provide a material web guide assembly.

Another object of the present invention is to provide a material web guide assembly for a printing press.

A further object of the present invention is to provide a material web guide assembly for guiding a material web being threaded into a web-fed rotary printing press.

Still another object of the present invention is to provide a material web guide assembly that can be adapted to varying distances between web guide rollers.

Yet a further object of the present invention is to provide a material web guide assembly having guide assemblies.

Even still another object of the present invention is to provide a material web guide assembly in which one guide assembly is shiftable with an adjustable web guide roller.

As will be discussed in greater detail in the description of the preferred embodiments which are set forth subsequently, the material web guide assembly of the present invention utilizes cooperating fixed and movable guide assemblies to form a guide path whose length is adjustable. One of the guide assemblies is movable with the shiftable or adjustable web guide roller so that the material web guide path is always around the adjustable web guide roller but does not form a path of web travel that extends to the outermost possible position of the adjustable roller. The other of the guide assemblies is fixed to the side frame of the press machine. In the several preferred embodiments, the guide assemblies includes various guide channel elements which form the continuous guide path for support of a material web guide chain or other pulling means. These guide channel elements may be supported by guide channel supports which are, in turn, secured either to the shiftable support for the adjustable web guide roller or to the side frame of the press assembly. These guide channel elements take several forms in the various preferred embodiments. They may be straight or curved, split or segmented, and telescopic or slidable. In all instances, the guide channel elements have a generally C-shaped cross-section which supports the material web guiding chain or other pulling device.

The primary advantage of the material web guide assembly of the present invention in comparison with the prior art devices is its ability to provide a web guide path whose length is related to the position of the adjustable web guide roller. Since the movable or shiftable guide assembly is supported by the mechanism which shifts the adjustable web guide roller, as its position is changed or shifted, so is the length of the guide path that is formed by the movable and fixed guide assemblies also changed. This creates a guide path for the material web threading chain or other pulling device that has the necessary length without causing the material web to travel a guide path that extends to the outermost possible limits of the shiftable location of the adjustable web guide roller. Accordingly, the formation of undesirable material web bags is eliminated.

The guide assemblies utilize guide channel elements which are supported by guide channel supports. In the several preferred embodiments, there are provided guide channel elements which either telescope with respect to each other, are segmented and extend or contract, or are split and can be brought together all so that a continuous guide path for the web threading chain or the similar other web pulling assembly will be formed.

The material web guide assembly of the present invention provides a web threading device guide path in a manner which overcomes the limitations and drawbacks of the prior art devices. This material web guide assembly is a substantial advance in the art.

BRIEF DESCRIPTION OF THE DRAWINGS

While the novel features of the material web guide assembly in accordance with the present invention are set forth with particularity in the appended claims, a full and complete understanding of the invention may be had by referring to the detailed description o the preferred embodiments which is set forth subsequently, and as illustrated in the accompanying drawings, in which:

FIG. 12 is a bottom plan view of the segmented guide channel elements of the third preferred embodiment and taken in the direction indicated by arrow E in FIG. 9;

FIG. 13 is a perspective view of one of the guide channel elements that makes up the segmented guide channel of FIG. 12;

FIG. 14 is a cross-sectional view of a guide channel element and taken along line XIV—XIV of FIG. 9;

DESCRIPTION OF THE PREFERRED EMBODIMENTS

Figure 1:
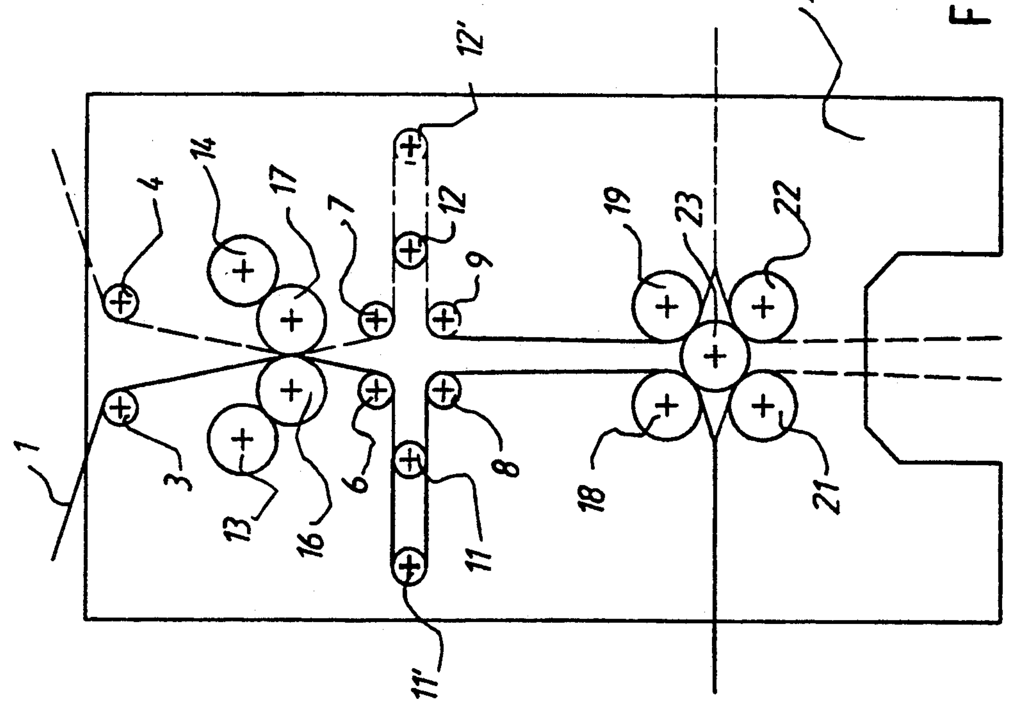
FIG. 1 is a schematic depiction of a nine cylinder, web fed rotary printing machine depicting the range of positions of adjustable web guide rollers and with which the material web guide assembly of the present invention is usable.

Referring initially to FIG. 1, there may be seen a schematic side elevation view of a nine-cylinder web-fed rotary printing press with which the material web guide assembly of the present invention is usable. A material web is guided through the printing press along a guide path, shown generally either in solid or dashed lines. The guide past takes the web part fixed web guide rollers 3, 4, 6, 7, 8 and 9 and past adjustable web guide rollers 11 and 12 whose maximum adjusted positions are depicted at 11' and 12'. The guide paths further brings the material web 1 into direct or indirect contact with plate cylinders 13 and 14, blanket cylinders 16, 17, 18, 19, 21 and 22 as well as the impression cylinder 23. All of these various cylinders and rollers are rotatably supported in machine frame walls 2 of the web-fed rotary printing press.

The material web guide assembly of the present invention is concerned with the provision of a guide path whose length is adjustable with movement of the adjustable web guide rollers 11 and 12. Thus the invention will be discussed hereinafter with respect to these rollers and specifically with respect to roller 11. This detailed description will be understood to be equally applicable to adjustable web guide roller 12. It will further be understood that the material web guide assembly discussed hereinafter with respect to adjustable web guide roller 11 is a part of the overall web guide path that is depicted by solid and dashed lines in FIG. 1.

Figure 6:
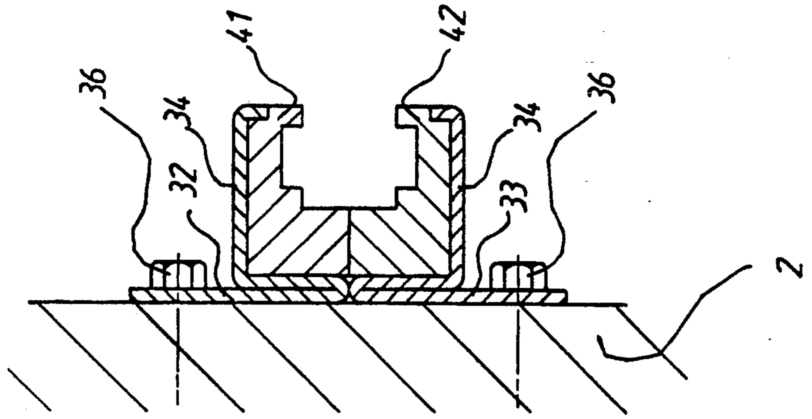
FIG. 6 is a cross-sectional view taken along line VI—VI of FIG. 3.
Figures 2, 3:
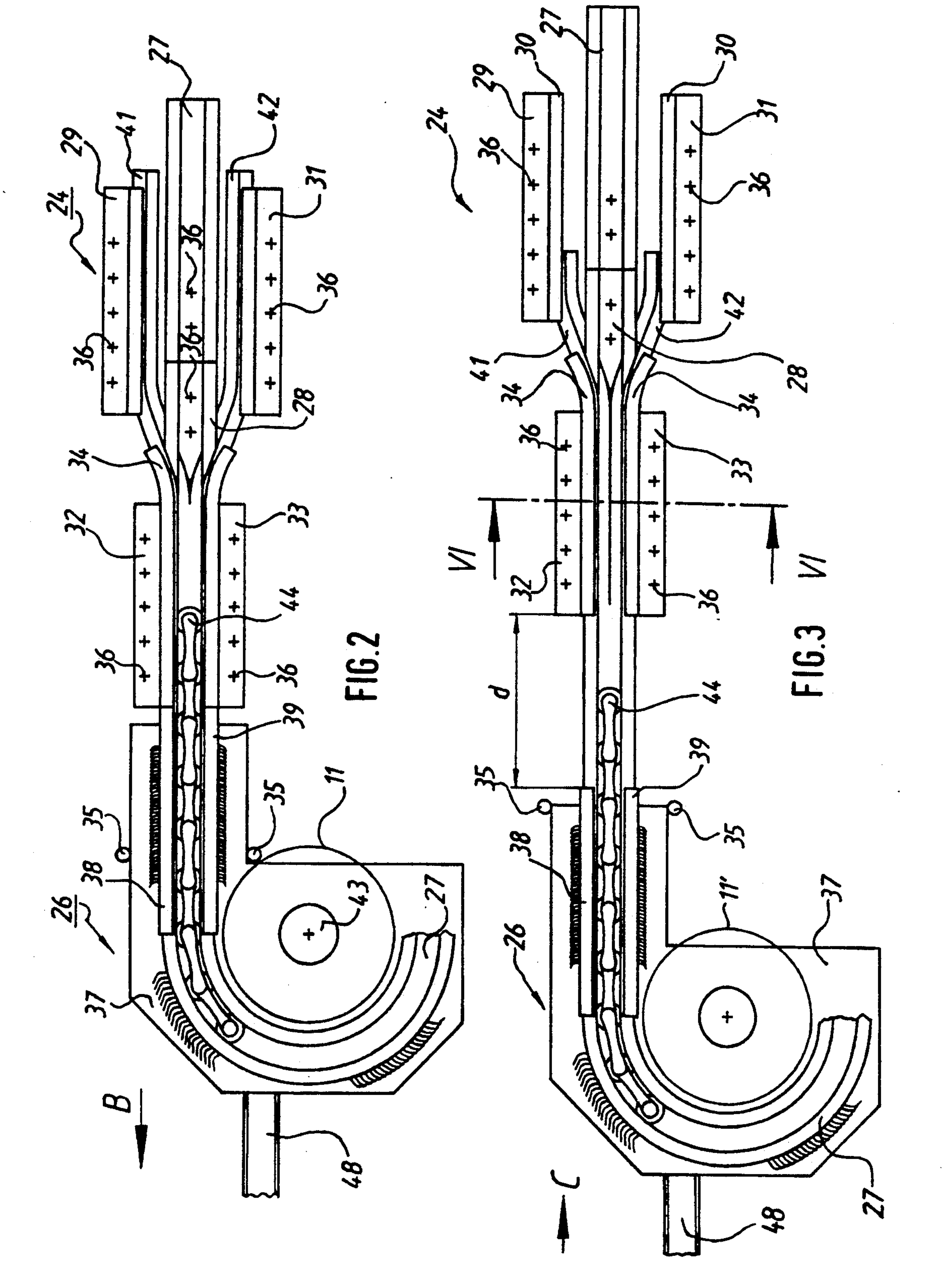
FIG. 2 is a side elevation view of a first preferred embodiment of a material web guide assembly in accordance with the present invention with the assembly in its minimum adjusted range position.
FIG. 3 is a view similar to FIG. 2 and showing the assembly in its maximum adjusted range position.

Turning now to FIGS. 2 and 3, there may be seen a first preferred embodiment of a material web guide assembly in accordance with the present invention. This material web guide assembly includes a frame fixed guide assembly, generally at 24 which is secured to the side frame 2 of the printing press, and a movable guide assembly, generally at 26 which is secured to, and movable with the adjustable web guide roller 11'. In FIG. 2, the material web guide assembly is shown in its minimum adjustment position in which the travel path of the web guide means is at its shortest. FIG. 3 shows the same device, but in the maximum adjusting range 11'. The guide assembly consists of the frame-fixed guide, on the whole designated with 24 and of the movable guide, on the whole designated with 26. The frame-fixed guide 24 comprises a guide channel 27 which is C-shaped in its cross section, with a wedge piece 29. Parallely to the parts 27 and 28, but at a distance which equals maximally the width of the C-shaped guide channel 27, there extend boundary bars or channel supports 29 and 31 on both sides of the elements 27 and 28, each of them being able to receive or to guide at its longitudinal edge by means of a recess 30, a rail half 41 or 42 of a split guide channel element which is a part of the movable guide 26 and which will be described later. The frame fixed guide 24 further comprises guide channel supports 32 and 33 which can receive or guide, analogously to the boundary bars 29 and 31, the half rails 41 and 42 at one longitudinal edge, also with a recess 34 and having a flare in the area of the tip of the wedge 28 which is just big enough to receive between the flare and the tip of the wedge piece 28 a half rail 41 or 42. The guide channel supports 32 and 33 of the stationary guide 24 are fixed by means of threaded screws 36 to the machine frame wall 2, as represented in FIGS. 1 and 6.

The movable guide assembly 26 consists of a base plate 37, on which guide channel supports 38 and 39 are fixed for receiving the chain guide channel 27. In the area of the frame-fixed guide 24 the chain guide channel 27 consists of the two half rails 41 and 42 which are, for example, made of a rubber profile and which, in the area of the movable guide 26 are made of plastic or of aluminum, having a C-shaped profile. A cross section through the chain guide channel 27 is represented in FIG. 6. Further, the movable guide assembly 26 consists of a bow-shaped or curved guide channel element 27 which is supported on base plate 37 around the adjustable web guide roller 11 which has an axle 43. In the guide channels 27, there is guided a roller chain 44 which is not represented in its total length and which serves for the threading-in of the material web.

Figure 7:
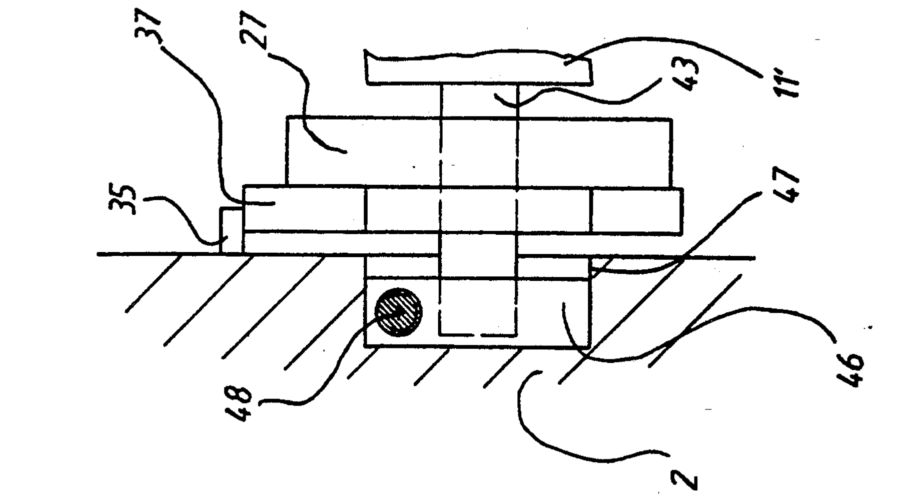
FIG. 7 is an end view taken in the direction indicated by arrow C in FIG. 3.

FIG. 7 shows the end view at C according to FIG. 3 in which can be seen especially, besides the adjustable web guide roller 11 in position 11' and the curved guide channel element having a C-profile 27, that the axle 43 of the roller 11 is held in a sliding block 46. Bearing elements for the axle 43 are not depicted for reasons of simplification. The sliding block 46 is guided in a groove 47 in the machine frame wall 2 and carries the movable guide assembly 26 on the axle 43. Instead of a groove in the machine frame wall 2, there can also be utilized a profiled bar, fixed to the machine frame wall 2. The sliding block 46 is movable in the direction of arrow B by means of a threaded spindle 48, as seen in FIG. 3 or is movable in the direction of arrow C according to FIG. 3. The threaded spindle 48 is actuated by a servomotor which is not shown. In FIG. 3, there is represented the stroke length d, which is the amount by which the adjustable web guide roller 11 moves into position 11'. The web guide roller 11 is always surrounded by the curved chain guide channel assembly 27, which moves with the movable guide assembly 26.

Figures 4, 5:
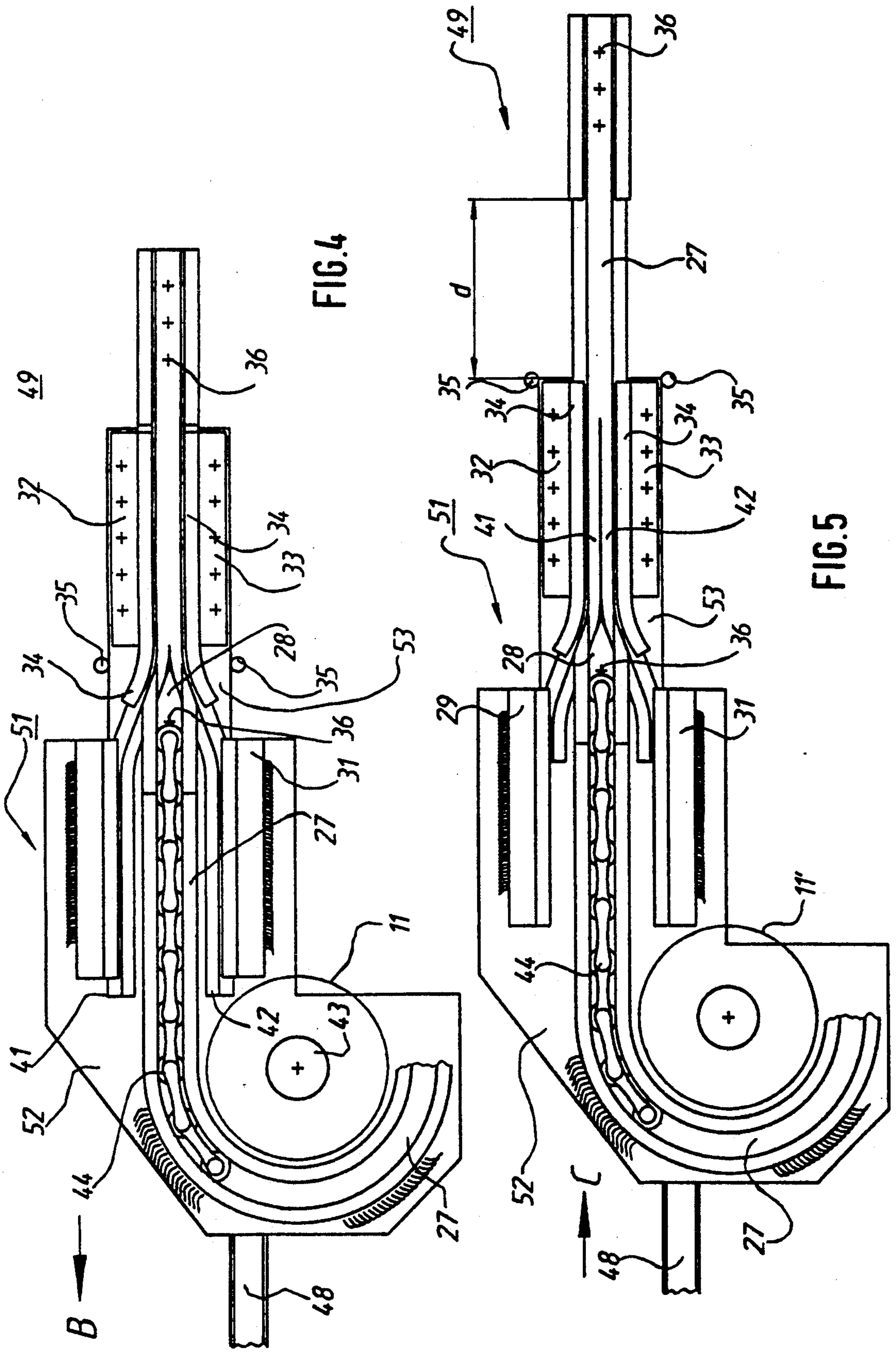
FIG. 4 is a side elevation view of a second preferred embodiment of a material web guide assembly in the minimum adjusted range position.
FIG. 5 is a view similar to FIG. 4 and showing the second preferred embodiment in its maximum adjusted range position.

Referring now primarily to FIG. 4 and 5, there is shown a second embodiment of the material web guide assembly in accordance with the invention. In this embodiment, the device according to FIG. 5 can be moved in the direction C by the amount "d" to come into the position depicted in FIG. 4. The depicted devices themselves consist of a frame-fixed guide assembly 49 and a movable guide assembly 51. The frame-fixed guide assembly 49 comprises two half rails 41 and 42 made of elastic material, which are fixed by means of threaded screws 36 on the machine frame wall 2. The other component parts are in connection with the movable guide assembly 51, and include a sliding block 46 in the groove 47, shown in FIG. 7. The movable guide assembly 51 comprises a base plate 52 with a bow-shaped guide channel element 27 of a solid material with a wedge piece 28 which is fixed by means of threaded screws 36 on the base plate 52. Parallel to the rectilinear extending profile element 27 on the base plate 52, there are arranged boundary bars 29 and 30 which each receive with one of their longitudinal edges the half rails 41 and 42, that are formed of elastic material. The base plate 52 has, on its side extending in the direction of the frame-fixed guide assembly 49, an elongated support member 53, carrying supports 32 and 33. These supports 32 and 33 have guide channel supports 34, having a flare in the area of the tip of the wedge piece 28, just big enough to receive between the flare and the tip of the wedge piece 28 a half rail 41 or 42. By driving the movable guide 51 in the direction B according to FIG. 4 the half rails 41 and 42 are joined in the above-mentioned area and the web guide roller 11 moves by the amount "d" into position 11' depicted in FIG. 5, in which the roller chain 44 can always be guided directly around the web guide roller 11, regardless of the position of the roller 11. It will not be necessary in every case to move the full amount of the stroke length "d", but it is always possible to move only a part of the stroke length "d", as may be necessary.

Figures 8, 9:
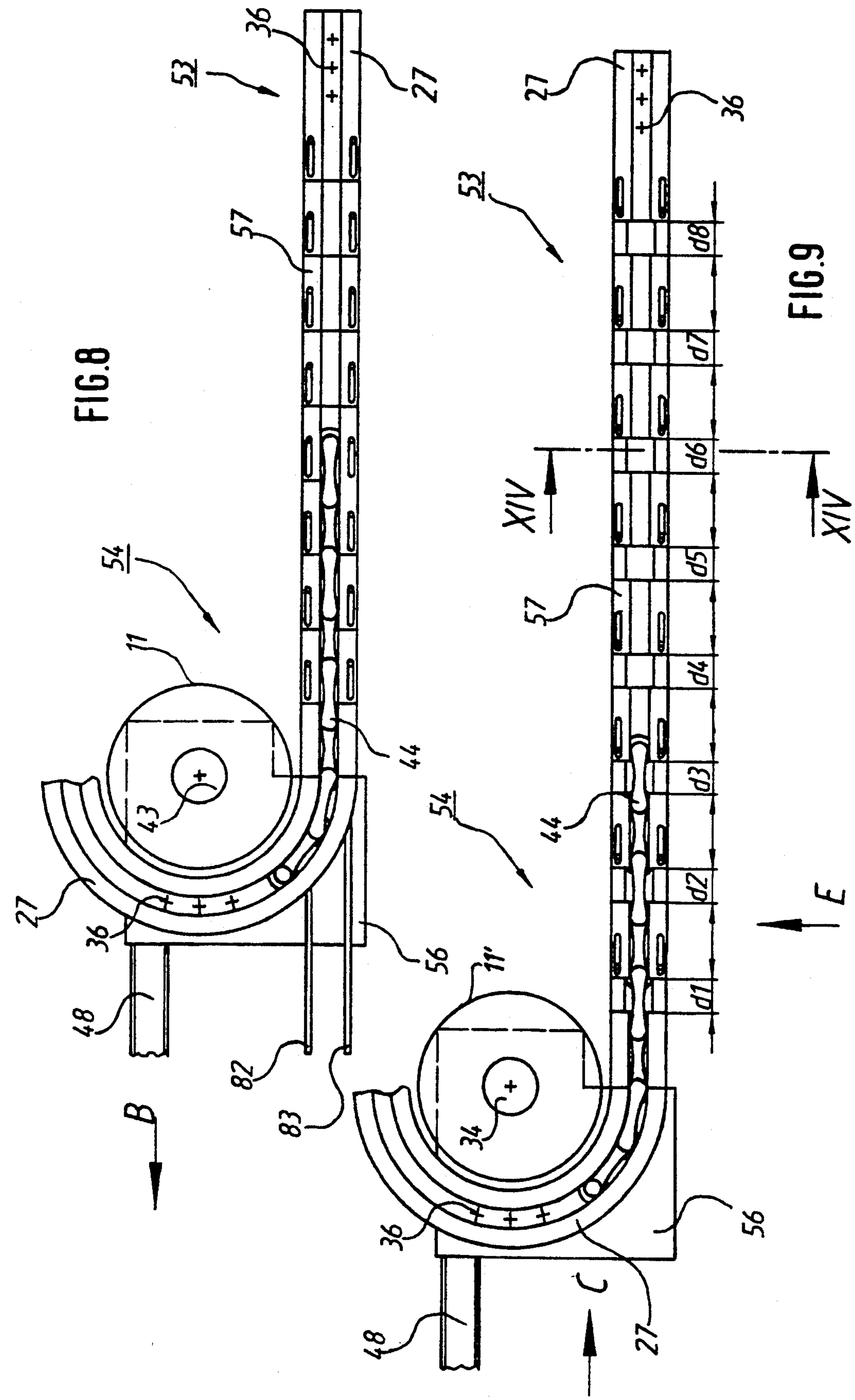
FIG. 8 is a side elevation view of a third preferred embodiment of a material web guide assembly in accordance with the present invention and showing the assembly in its minimum adjusted range position.
FIG. 9 is a view similar to FIG. 8 and showing the assembly in its maximum adjusted range position.

Turning now to FIGS. 8 and 9, there may be seen a third preferred embodiment of the material web guide assembly according to the invention, which can be moved, as shown in FIG. 8, in the direction of arrow B for obtaining the position 11' of the adjustable web guide roller 11 according to FIG. 9. The total stroke length is composed of the individual stroke lengths $d_1$ to $d_8$. The web guide assembly consists of a frame-fixed guide assembly 53, fixed by means of threaded screws 36 on the machine frame wall 2, shown in FIG. 1 and which includes a C-profile straight guide channel element 27 which also supports guiding rods 82 and 83. Instead of these guiding rods 82 and 83, there can also be utilized other guidings, such as tee slot guidings or similar types.

A movable guide assembly 54 consists of a base plate 56 on which is fixed a semi-circular C-profile guide channel element 27 which is guided around the web guide roller 11. The base plate 56 is held by means of a threaded spindle 48 over the axle 43, as seen in FIG. 7, in a sliding block 46 which is guided in a groove 47 in the machine frame wall 2. Beyond the semi-circular profile guide channel element 27, and in the direction of the frame-fixed guide assembly 53, the movable guide 54 includes a number of segmented guide elements, which can be pulled out against each other, and which are designated on the whole as guide channel 57 and which are shown in detail in cross-section in FIG. 14 and shown in FIG. 13 in a perspective representation.

In the bottom plan view shown in FIG. 12, and taken in the direction indicated by the arrow E in FIG. 9, and further referring to FIGS. 13 and 14, it will be seen that the segmented guide channel 57 consists of a plurality of guide channel base bodies 58 with each body 58 generally having a C-shaped cross section for receiving the roller chain 44. The base body 58 has two lateral prolongations or butt straps 59 and 61, extending in the axial direction of channel 57. At the end of each butt strap 59 and 61 there is arranged a bolt 62 or 63, respectively. In the base body 58 there are cut out two recesses 64 and 66, so that there are formed on that side which is not facing the butt straps 59 and 61, four free legs 67 and 68; 69, and 71. The upper adjacent legs 67 and 68 have slits 72 and 73 respectively, extending in the axial direction. The lower legs 69 and 71, positioned opposite to them, are each provided with an axial borehole 74 or 76 which penetrates the whole base body 58. Each of the boreholes 74 and 76 has at its ends a counterbore 77 or 78 for receiving a compression spring 79 or 81, as shown in FIG. 12. To combine the individual guide elements 58 to form the movable guide assembly 54, the adjacent guide elements 58 are connected with each other by insertion of the butt straps 59 and 61 of one body into the recesses 64 and 66 of the adjacent body and the bolts 62 and 63, arranged on the butt straps 59 and 61, are guided in the slits 72 and 73. Instead of bolts and slits there could be utilized as well stops and limitations having another shape. In the boreholes 76 and 77 there are arranged the guiding rods 82 and 83, thus connecting the individual guiding elements 58 with each other. Between the individual guiding members 58 of the guide channel 57, there are arranged compression springs 79 and 81 on the guiding rods 82 and 83 which are received by the counterbores 77 and 78 according to the position of the movable guide assembly 54 according to FIG. 8. In FIG. 12, there are shown driving pins 84 of the roller chain 44, to which the material web to be threaded-in, is secured. The length of the slits 72 and 73 nearly corresponds to the partial stroke lengths $d_1$ to $d_8$.

Figure 10:
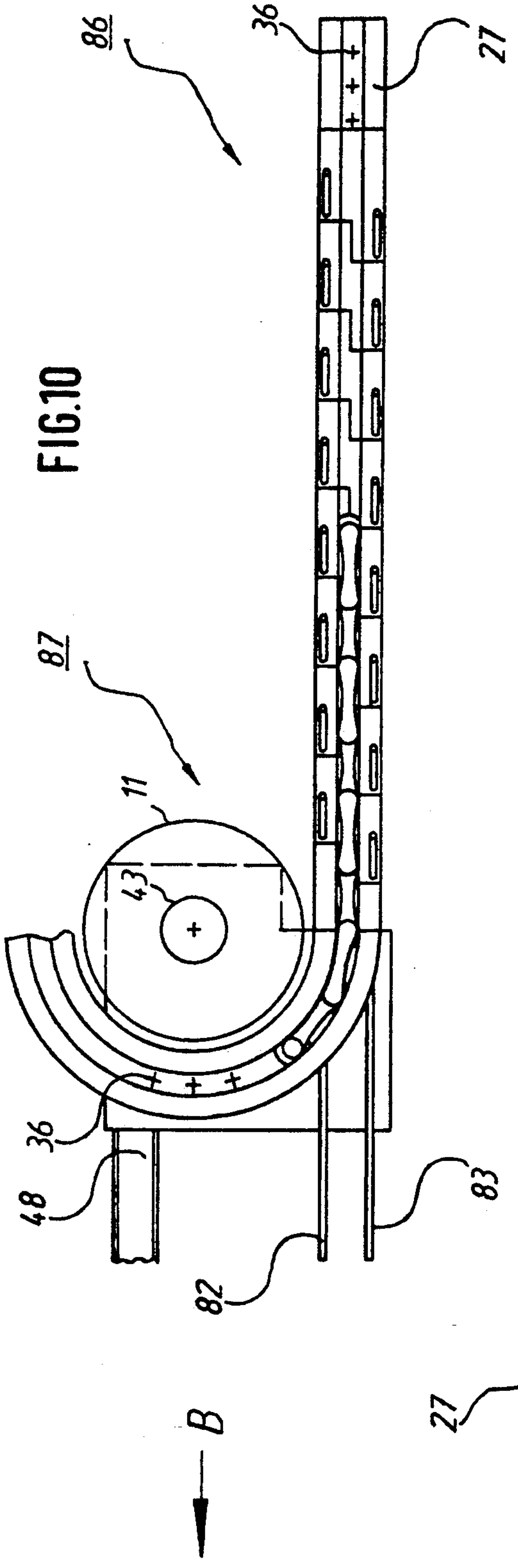
FIG. 10 is a side elevation view of a fourth preferred embodiment of a material web guide assembly and showing the assembly in its minimum adjusted range position.
Figure 11:
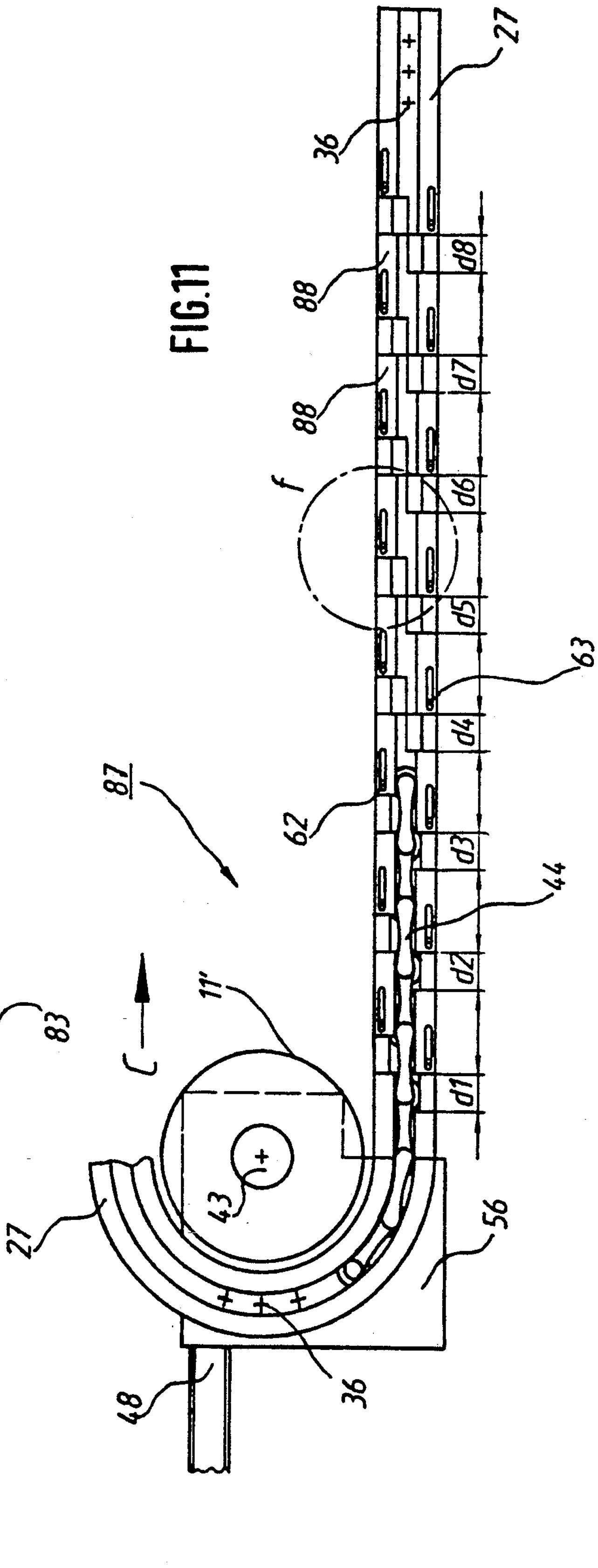
FIG. 11 is a view similar to FIG. 10 and showing the assembly in its maximum adjusted range position.

Referring now to FIGS. 10 and 11, there is depicted a fourth preferred embodiment of the present invention, which is movable in the direction of arrow B according to FIG. 10, for obtaining the position 11' of the adjustable web guide roller 11, as seen in FIG. 11. The total stroke length "d" is comprised of the individual stroke lengths $d_1$ to $d_8$. The device consists of a frame-fixed guide assembly 86 which is fixed by means of threaded screws 36 to the machine frame wall 2, shown in FIG. 1, and which consists of a C-profile straight guide channel 27 including guiding rods 82 and 83. A movable guide assembly 87 consists of a base plate 56, on which there is fixed a semi-circular guide channel having a C-profile 27, which is supported around the web guide roller 11. The base plate 56 is held by means of a threaded spindle 48 over the axle 43, as shown in FIG. 7, in a sliding block 46 which is itself guided in a groove 47 in the machine frame wall 2. Outside the semi-circular C-profile guide channel 27, and in the direction of the frame-fixed guide assembly 86, the movable guide assembly 87 consists of a number of guide elements which can be pulled out against each other, and being designated on the whole as guide channel 88 and shown in detain in FIG. 15 and in FIG. 16 in perspective representation.

Figure 15:
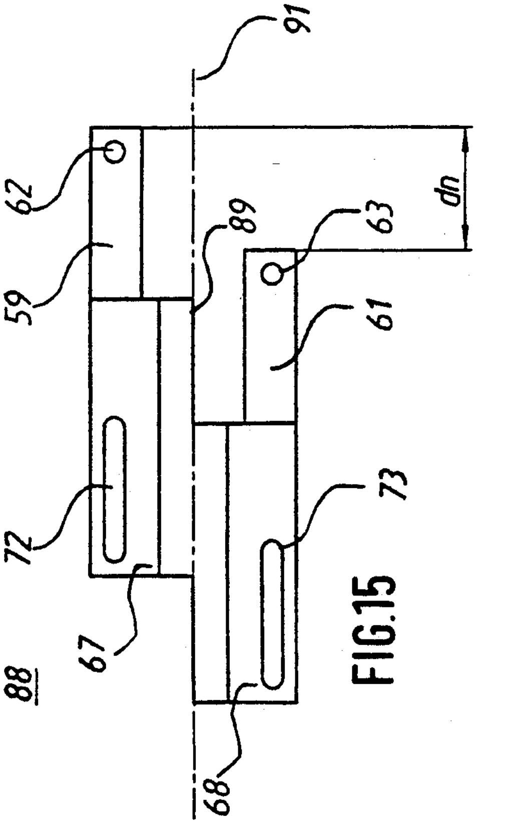
FIG. 15 is a top plan view of a guide channel element of the fourth preferred embodiment of the material web guide assembly of the present invention.
Figure 16:
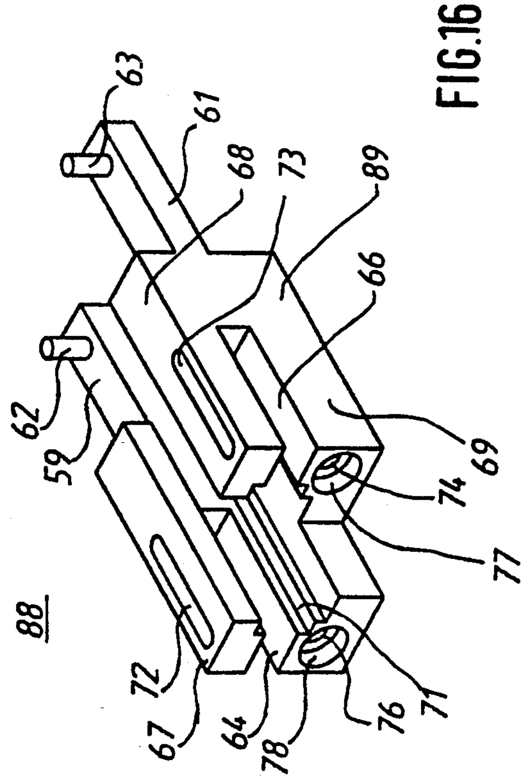
FIG. 16 is a perspective view of the guide channel element of FIG. 15.

There can be seen in FIGS. 15 and 16 that the segmented guide channel 88 consists of a plurality of base bodies 89 each generally having a C-shaped cross section (FIG. 16) for receiving the roller chain 44. Each base body 89 has two lateral prolongations or butt straps 59 and 61, extending in the axial direction. At the end of each of the butt straps 59 and 61, there is rectangularly arranged a bolt 62 or 63. In the base body 89 there are formed two recesses 64 and 66, so that there are formed on that side which is not facing the butt straps 59 and 61, four free legs 67, 68, 69 and 71. The upper adjacent legs 67 and 68 have slits 72 and 73, extending in the axial direction. The lower legs 69 and 71, which are positioned opposite to upper legs 67 and 68, are each provided with an axial borehole 74 or 76 which penetrates the whole base body 58. Each of the boreholes 74 and 76 has, at its ends, a counterbore 77 or 78 for receiving a compression spring 79 or 81, analogously to FIG. 12. As can be further seen from FIG. 15, the guide member body 89 is formed with a half-side offset, looked at in the axial direction such that the component parts 67 and 59 are, looked at along the center line 91, offset by the amount $d_n$ in relation to the component parts 68 and 61. The functioning is analogous to the description of the third embodiment. The advantage of this execution in comparison to the execution of the guide member 57 according to FIG. 13 is, that in the guide member 57 according to FIG. 13, the guiding of the roller chain 44 is constantly effected at three sides of the four sides of the C-shaped profile 27, which has the result of a better guiding of the roller chain 44.

Figures 17, 18:
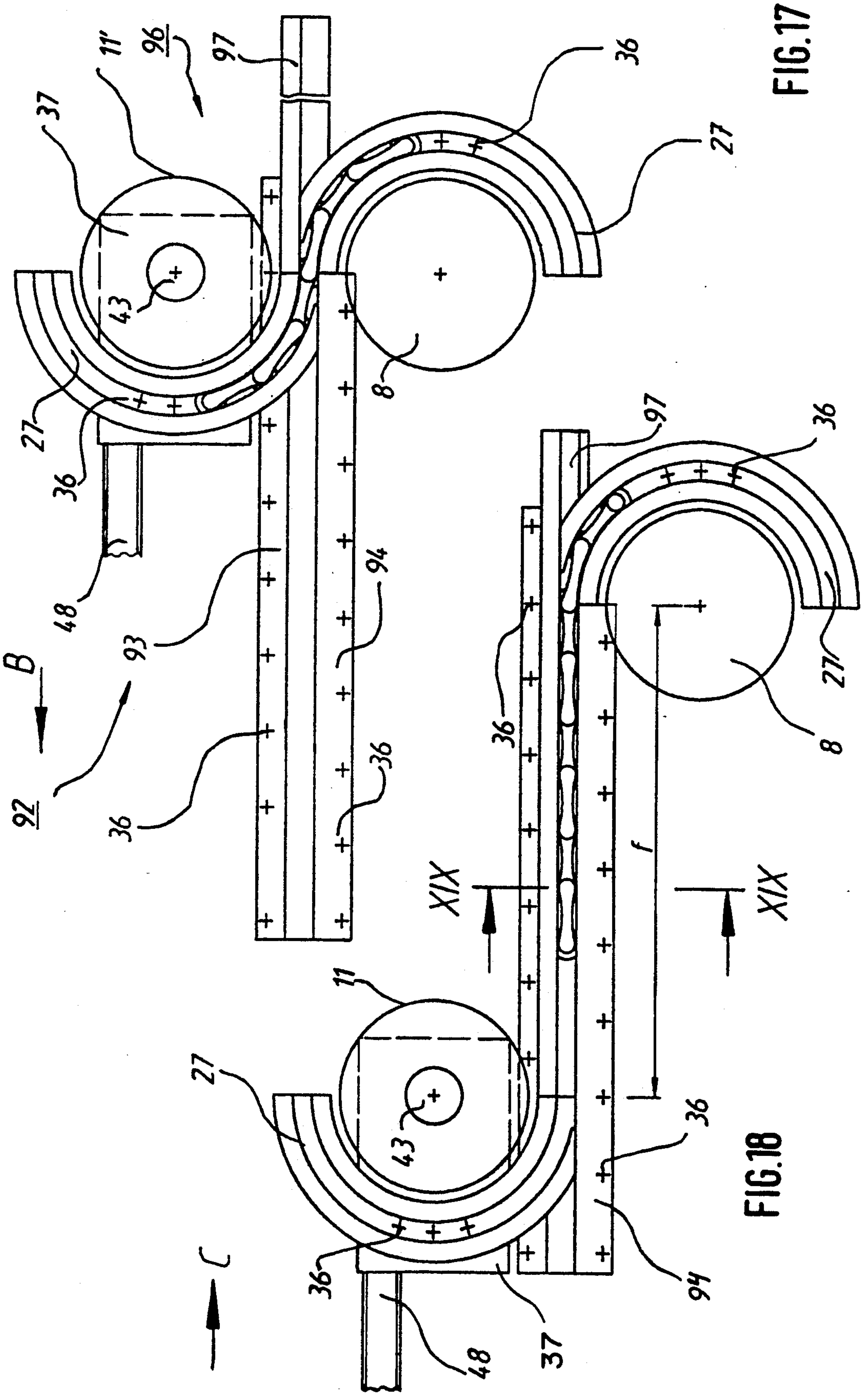
FIG. 17 is a side elevation view of a fifth preferred embodiment of a material web guide assembly in accordance with the present invention and showing the assembly in the minimum adjusted range position.
FIG. 18 is a view similar to FIG. 17 and showing the assembly in its maximum adjusted range position.

A fifth preferred embodiment of a material web guide assembly in accordance with the present invention is shown in FIGS. 17 and 18. In this fifth embodiment, the movable guide assembly 96 is movable in the direction of arrow B according to FIG. 17, for obtaining the position 11' of the adjustable web guide roller 11 according to FIG. 18. During this movement, the stroke length "f" is obtained, which is bigger than the previous stroke length "d". In contrast to the orientation shown in FIG. 1, in FIG. 17 the web guide roller 11 is in a position above the web guide roller 8. This arrangement can be especially utilized for registering in the base frame, when two different printing towers have to be approached, e.g. at four color front-, one color reverse-print or four color front-, four color reverse-print and when during this the connection is effected by the base frame of the machine.

Figure 19:
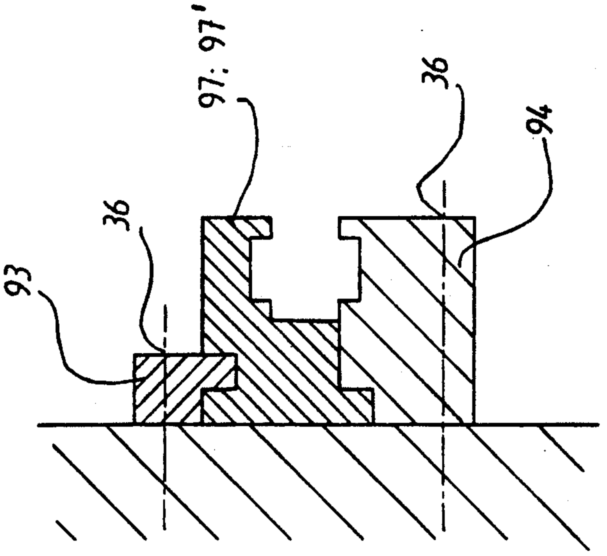
FIG. 19 is a cross-sectional view of a portion of the fifth preferred embodiment of a guide assembly and taken along line XIX—XIX of FIG. 18.

The fifth preferred embodiment includes a frame-fixed guide assembly, generally at 92 as seen in FIGS. 17 and 18 and as is also shown in cross-section in FIG. 19. The frame-fixed guide assembly 92 includes guide channel supports 93 and 94 which are secured by threaded screws on the machine frame wall 2, represented in FIG. 1. The channel supports 93 and 94 are followed by a semi-circular C-profile guide channel element 27 which is also screwed by means of threaded screws 36 on the machine frame wall 2 and is placed around the stationary web guide roller 8 according to FIG. 1. The movable guide assembly is designated on the whole as 96 and consists of a base plate 37, on which a semi-circular C-profile guide channel element 27 is fixed, and which is positioned around the web guide roller 11. The base plate 37 is held, as depicted in FIG. 7, by means of a threaded spindle 48 over an axle 43 in a sliding block 46 which is guided in a groove 47 in the machine frame wall 2. The semi-circular C-profile guide channel element 27 is followed by a guiding rail 97 which receives, in the position shown in FIG. 18, together with the support 94, the roller chain 44. The roller chain 44 is represented here by only a few chain members.

Figures 20, 21:
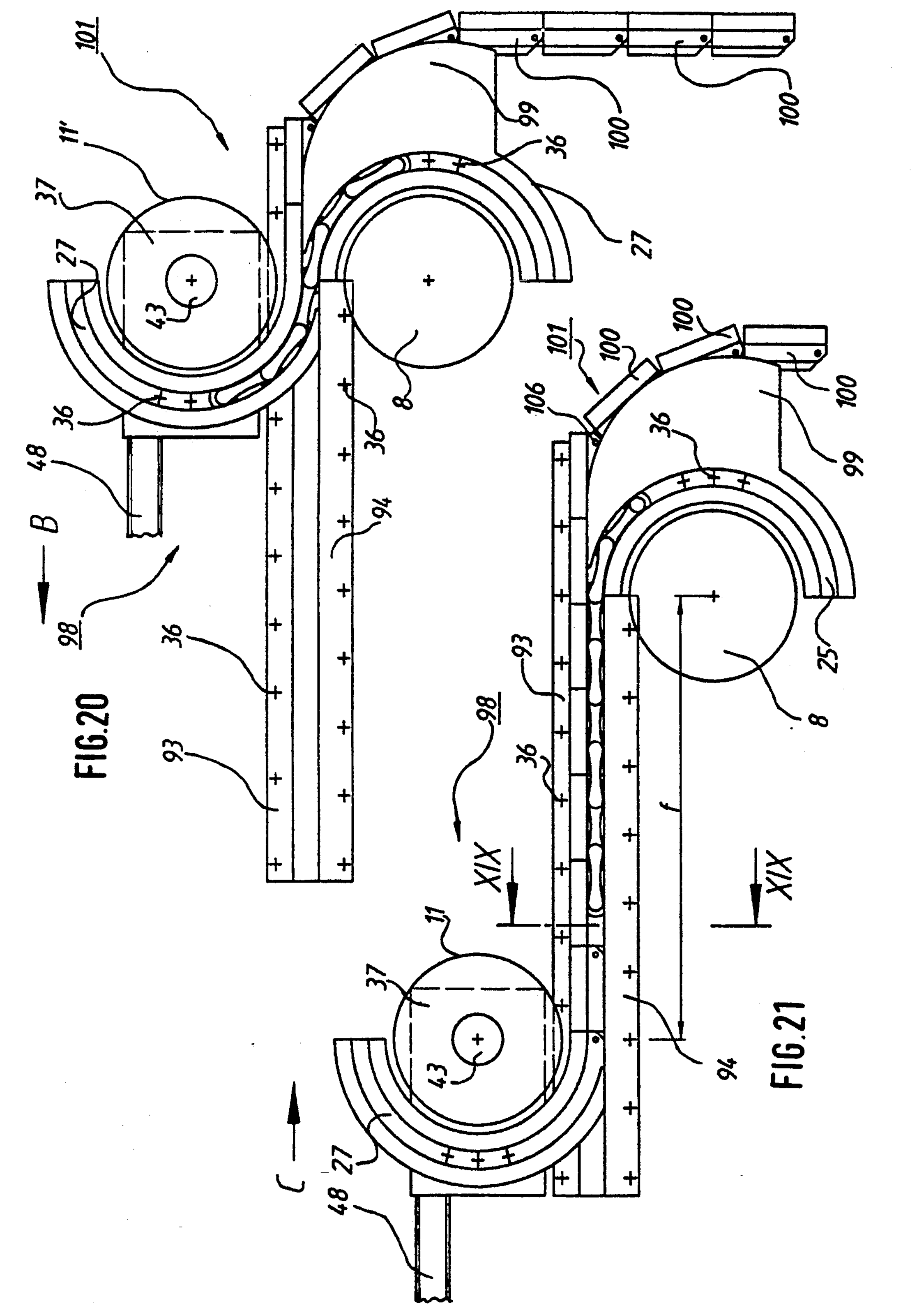
FIG. 20 is a side elevation view of a sixth preferred embodiment of a material web guide assembly in accordance with the present invention and showing the assembly in its minimum adjusted range position.
FIG. 21 is a view similar to FIG. 20 and showing the assembly in its maximum adjusted range position.

Turning now to FIGS. 20 and 21, there is depicted a sixth preferred embodiment of a material web guide assembly according to the present invention, which can be moved, according to FIG. 20, in the direction of arrow B, for obtaining the position 11' of the adjustable web guide roller 11, shown in FIG. 21. During this movement, there is obtained a stroke length "f", which is bigger than the previous stroke length "d" of the first four variants. Different from the representation shown in FIG. 1, the web guide roller 11 is, similarly to FIG. 17, in a position above the web guide roller 8. This arrangement can be utilized especially in such cases, as were described previously with respect to the fifth preferred embodiment. The sixth preferred embodiment consists of a frame-fixed guide assembly, on the whole designated with 98 and further shown in the cross-sectional view of FIG. 19. This frame-fixed guide assembly 98 consists of a guide channel support 93 and 94, which is secured by means of threaded screws 36 on the machine frame wall 2, represented in FIG. 1. The support 93 and 94 is followed by a semi-circular C-profile guide channel element 27 which is screwed by means of threaded screws 36 on the machine frame wall 2 and is positioned around the stationary web guide roller 8 shown to FIG. 1.

Figure 22:
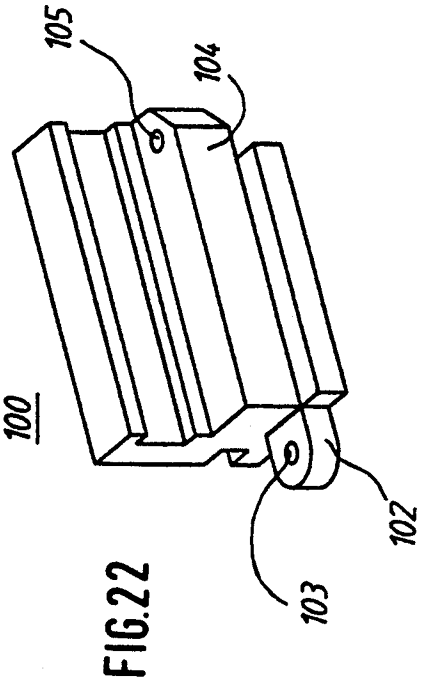
FIG. 22 is a perspective view of a guide channel element usable in the sixth preferred embodiment.

In contrast to the fifth preferred embodiment which is shown in FIGS. 17 and 18, in the sixth preferred embodiment there is arranged on the outer side of the semi-circular C-profile guide channel element 27 which leads around the stationary web guide roller 8, a wedge-shaped deflecting element 99 with a guide for receiving segmented guide channel elements 100 which are hingedly connected with each other. The movable guide assembly for the sixth preferred embodiment is designated on the whole as 101 and consists of a base plate 37, on which a semi-circular C-profile guide channel element 27 is fixed, and which is positioned around the web guide roller 11. The base plate 37 is held according to FIG. 7 by means of a threaded spindle 48 over an axle 43 in a sliding block 46 which is guided in a groove 47 in the machine frame wall 2. The semi-circular C-profile guide channel element 27 is followed by a guiding rail 97' which receives, in the position according to FIG. 21, together with the support 94, the roller chain 44. The roller chain 44 is shown schematically by only a few chain members. The guiding rail 97' consists of guiding members 100, which are hingedly connected with each other and receive the roller chain 44. The guiding members 100 are perspectively represented in FIG. 22. The guiding members 100 have a profile 97, 97' shown in FIG. 19 and form, together with the support 94, the C-shaped channel for the roller chain 44. As seen in FIG. 22, each guiding member 100 has a butt strap 102 with a borehole 103. The butt strap 102 of a first guide channel element 10' is receivable in a recess 104 with a borehole 105 of a second subsequent and not represented guide element 100. The guide members 100 are connected with each other by means of pins 106, as may be seen in FIG. 21. Thus as the movable guide assembly 101 moves in the direction indicated by arrow B in FIG. 20, the hingedly connected guiding members 100 cooperate to form an extension of upper support 93 so that the chain 44 will be guided in a continuous C-shaped guide channel regardless of the location of the movable web guide roller 11'.

Figure 23:
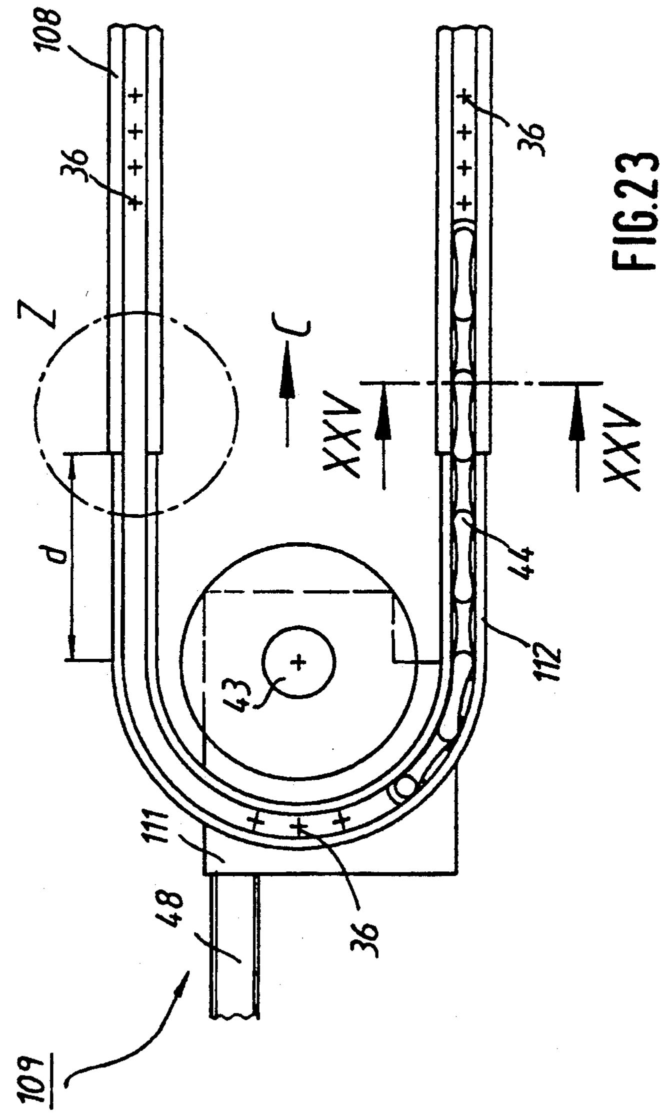
FIG. 23 is a side elevation view of a seventh preferred embodiment of a material web guide assembly in accordance with the present invention with the assembly in its maximum adjusted range position.
Figure 24:
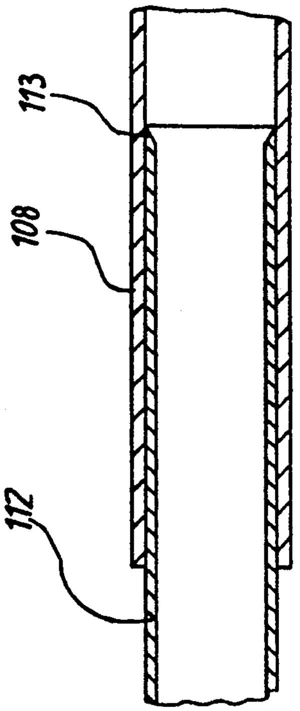
FIG. 24 is a detail view of the encircled portion Z of the guide channel of FIG. 23.

There may be seen a seventh preferred embodiment of a material web guide assembly in FIGS. 23 and 24. In this embodiment, the movable web guide roller 11' is movable in the direction indicated by arrow C due to the cooperation of telescopingly connected frame fixed guide assembly 107 and movable guide assembly 109. The frame-fixed guide assembly 107 consists of C-shaped profile straight guide channel elements 108 that are secured by threaded screws 36 on the machine frame wall 2, represented in FIG. 1. The movable guide assembly 109 consists of a base plate 111 on which there is secured a curved C-profile guide channel element 112 which is placed about the circumference of the movable web guide roller 11. The base plate 111 is held by means of a threaded spindle 48 over the axle 43 according to FIG. 7 in a sliding block 46, which is guided in a groove 47 in the machine frame wall 2. The ends of the C-shaped profile curved guide channel element 112 can be pushed telescopically into the ends of the C-profile straight guide channel elements 108 and has, as seen in FIG. 24, wedge-shaped bevels 113 at its end, for ensuring a shock-free movement of the roller chain 44 in both running directions. The roller chain 44 is depicted only by one chain member with driving pins 84. The stroke length is indicated at "d".

Figure 26:
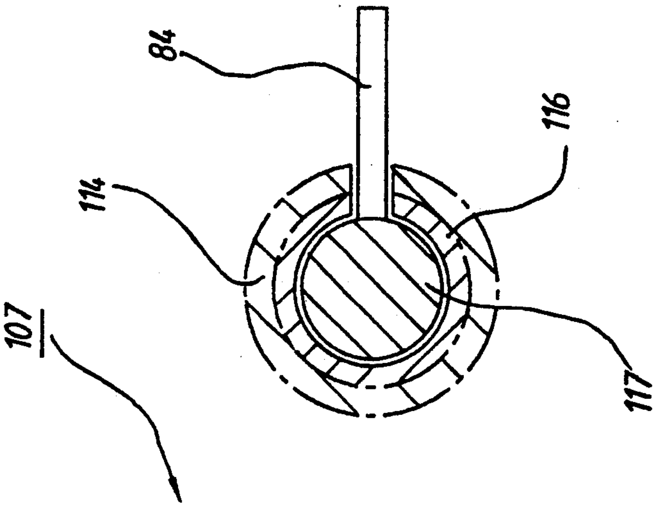
FIG. 26 is a cross-sectional view of a guide channel assembly of an eighth preferred embodiment of a material web guide channel assembly in accordance with the present invention.
Figure 25:
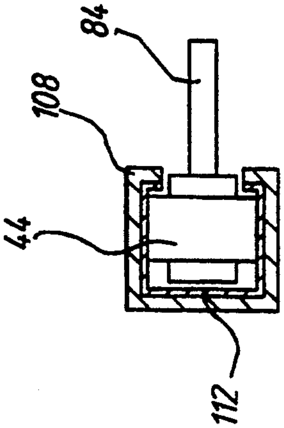
FIG. 25 is a cross-sectional view of the guide channel of the seventh preferred embodiment and taken at line XXV—XXV of FIG. 23.

Finally, in FIG. 26, there is depicted a further guide assembly having fixed and movable channel guide assemblies, generally at 114 and 116. These guide channel assemblies are generally C-shaped in cross-section and are telescopically slidable in a manner similar to the seventh preferred embodiment. A material web pulling means, generally at 117 is sized to be slidably carried in the inner C-shaped guide assembly 116. This pulling means 117 has laterally extending driving pins 84 for attachment of the web to be threaded to the pulling means 117. This pulling means 117 can be manufactured of various materials, such as plastic, and can be driven by suitable friction gears or the like. It will be understood that pulling means 117 and the cooperating profile sections 114 and 116 could have various cross-sectional shapes such as circular, oval, square or rectangular, as desired.

While preferred embodiments of a material web guide assembly in accordance with the present invention have been set forth fully and completely hereinabove, it will be apparent to one of skill in the art that a number of changes in, for example, the overall size of the press, the drive means for the roller chain, the support bearings for the rollers and the like could be made without departing from the true spirit and scope of the present invention which is accordingly to be limited only by the following claims.

What is claimed is:

1. A material web guide assembly usable to provide an adjustable length web guide path for guiding a material web being threaded through a printing press, said material web guide assembly comprising:

a fixed guide assembly securable to the printing press;

a movable guide assembly cooperating with said fixed guide assembly and movable relative thereto to define an adjustable length web guide path;

a shiftable web guide roller movably carried by the printing press and shiftable between maximum and minimum positions to vary said adjustable length web guide path;

means for securing said movable guide assembly to said shiftable guide roller;

means for effecting shifting of said shiftable guide roller and said movable guide assembly relative to said fixed guide assembly; and means for maintaining said web guide path continuous during said relative movement between said fixed and movable guide assemblies.

2. The material web guide assembly of claim 1 wherein said movable guide assembly includes a curved guide channel which is positioned about said shiftable web guide roller.

3. The material web guide assembly of claim 1 further including pulling means movable along said guide path to thread a material web along said guide path.

4. The material web guide assembly of claim 1 wherein said movable guide assembly includes a resilient, split guide channel element.

5. The material web guide assembly of claim 4 wherein said fixed guide assembly includes a fixed guide element having a wedge-shaped end which engages said split guide channel element.

6. The material web guide assembly of claim 1 wherein said fixed guide assembly includes a resilient, split guide channel element.

7. The material web guide assembly of claim 6 wherein said movable guide assembly includes a movable guide element having a wedge-shaped end which engages said split guide channel.

8. The material web guide assembly of claim 1 wherein said movable guide assembly includes a guide channel comprised of a plurality of interconnected telescopingly segmented guide channel elements.

9. The material web guide assembly of claim 8 wherein each of said segmented guide channel elements includes spaced butt straps with pins and spaced slotted legs which cooperate with said butt straps and pins of an adjacent one of said segmented guide channel elements.

10. The material web guide assembly of claim 1 wherein said fixed guide assembly has a fixed guide channel element and said movable guide assembly has a movable guide channel element, said fixed and movable guide channel elements cooperating to form said web guide path.

11. The material web guide assembly of claim 10 further wherein said fixed guide assembly has a wedge shaped deflecting member and said movable guide channel element has a guiding rail which rides on said wedge shaped deflecting member.

12. The material web guide assembly of claim 1 wherein said fixed guide assembly and said movable guide assembly include telescoping cooperable guide channels.

13. The material web guide assembly of claim 1 wherein said fixed guide assembly is secured to the printing press by threaded screws.

14. The material web guide assembly of claim 1 wherein said shiftable web guide roller is rotatable about an axle and further wherein said axle is secured to a sliding block shiftably supported in a groove in a wall of the printing press.

15. The material web guide assembly of claim 14 further wherein a base plate is supported by said axle and further wherein said base plate supports said movable guide assembly.

16. The material web guide assembly of claim 14 wherein said sliding block is shiftable in said groove by a threaded spindle.

17. The material web guide assembly of claim 1 wherein said pulling means is a roller chain.

18. The material web guide assembly of claim 1 wherein said pulling means has a circular cross-section.

19. The material web guide assembly of claim 1 wherein said guide path has a generally C-shaped cross-section.

20. The material web guide assembly of claim 5 further including guide channel supports for said guide channel elements.

* * * * *